United States Patent [19]

Yamamichi

[11] 4,189,220
[45] Feb. 19, 1980

[54] DIAPHRAGM CLOSING DEVICE FOR A CAMERA WITH AN ELECTROMAGNETIC CONTROL SYSTEM

[75] Inventor: Masayoshi Yamamichi, Kawasaki, Japan

[73] Assignee: Canon Kabushiki Kaisha, Tokyo, Japan

[21] Appl. No.: 761,961

[22] Filed: Jan. 24, 1977

[30] Foreign Application Priority Data

Jan. 27, 1976 [JP] Japan ................................. 51-7666

[51] Int. Cl.² .......................... G03B 7/08; G03B 9/02; G03B 17/38
[52] U.S. Cl. ..................................... 354/43; 354/266; 354/272
[58] Field of Search ................ 354/43, 232, 266, 268, 354/269, 272

[56] References Cited

U.S. PATENT DOCUMENTS

| | | | |
|---|---|---|---|
| 3,906,517 | 9/1975 | Nomura et al. | 354/272 X |
| 3,906,533 | 9/1975 | Mita | 354/272 |
| 3,961,343 | 6/1976 | Shono | 354/272 X |
| 3,988,748 | 10/1976 | Iura et al. | 354/43 X |

Primary Examiner—L. T. Hix
Assistant Examiner—William B. Perkey
Attorney, Agent, or Firm—Toren, McGeady and Stanger

[57] ABSTRACT

An automatic exposure control camera wherein the aperture preset ring in the photographic lens of the electromagnetic aperture control system for controlling the automatic aperture mechanism by means of the electromagnetic attracting means is charged at the totally opened position by means of the driving mechanism at the side of the camera every time a photograph is taken. By means of the shutter release operation, the aperture preset ring is moved from the totally opened position to the most closed position so as to determine the aperture value of the aperture preset ring. The camera is provided with a means for making the aperture preset ring rotatable up to a certain determined aperture value by operating the release member of the automatic exposure control operation by means of the control member of the automatic aperture mechanism operated and, in turn by means of the diaphragm closing operation means whereby the depth is confirmed by the diaphragm closing operation with the diaphragm closing operation means.

11 Claims, 5 Drawing Figures

DIAPHRAGM CLOSING DEVICE FOR A CAMERA WITH AN ELECTROMAGNETIC CONTROL SYSTEM

BACKGROUND OF THE INVENTION

1. Field of the Invention

The present invention relates to a diaphragm closing device for the focus depth confirmation of the electromagnetic operative control camera whose lens aperture mechanism is operated in accordance with the electromagnetic control system.

2. Description of the Prior Art

In the case of an automatic exposure control camera which is so designed that the aperture preset ring of the photographic lens is charged at the totally opened position every time in functional engagement with the winding up operation of the camera, the aperture preset ring is driven from the totally opened position to the most closed position by means of the shutter release operation and the aperture value (preset value) of the photographic lens is determined by means of the operation result in accordance with the photographic information. It is necessary to move the automatic aperture pin and to release the holding of the aperture preset ring in order to confirm the focus depth in advance before taking a photograph. This is because the aperture preset ring is held at the totally opened position when the photographic lens in the automatic exposure control (AE) camera so composed is in the wound up state. Namely, in order to confirm the focus depth, it is necessary to bring the aperture set ring out of the AE mark and set the ring at the desired aperture mark. Further, when the diaphragm closing operation is carried out for confirming the focus depth when the photographic lens is set at the automatic exposure control (AE) mark, misjudgment of the focus depth takes place because the photographic lens is automatically closed down to the smallest aperture position. Consequently, when the aperture ring is set at the AE mark in the case of the camera with electromagnetic aperture control system, it becomes necessary to provide a mechanism for making the diaphragm closing impossible by locking the diaphragm closing device at the side of the camera.

In the conventional camera, the conventional motion picture camera and so on, for the aperture mechanism of the photographic lens, the manual operation system with the aperture ring provided on the lens barrel or the automatic aperture system for mechanically closing the diaphragm down to the position controlled with the sealing angle of the finger of the exposure meter is mostly used. However, quite recently, a camera to which the electromagnetic aperture control system for instantaneously closing the diaphragm mechanism down to a certain predetermined value releasing the attractive efficiency of the magnet is applied has been proposed. Hereby, in the case of the conventional camera with the electromagnetic aperture control system as mentioned above, a magnet is usually provided between the electrical circuit for controlling the aperture and the aperture control mechanism in such a manner that the control operation of the electrical circuit for supplying the magnet with current is utilized.

In the case of the camera of the electromagnetic aperture control system it is necessary to make the operation time of the electrical circuit, the magnet and the aperture control mechanism as short as possible in order not to lose the shutter opportunity, for which purpose various proposals have been made. However, when the operation time is shortened, the precision of the aperture is generally lowered in such a manner that the exposure accuracy of the camera is lowered, which is inconvenient.

The present invention relates to the improvement of the camera of the Japanese Patent Application Sho 50-95120 applied for on Aug. 5, 1975 by the present inventors as the electromagnetic aperture control system free from the shortcomings of the camera of the conventional electromagnetic aperture control system in such a manner that the operation time of the aperture control mechanism is shortened while the exposure accuracy is increased as much as possible. The invention more particularly relates to the diaphragm closing device for the focus depth confirmation of the camera of the above mentioned electromagnetic aperture control system.

BRIEF SUMMARY OF THE INVENTION

Objects of the Invention

An object of the present invention is to provide a diaphragm closing device whose composition is remarkably simple and which can be applied to the camera with the electromagnetic aperture control system quite effectively.

Another object of the present invention is to provide a diaphragm closing device by means of which a sure focus depth can be confirmed, preventing any misoperation.

A further object of the present invention is to provide a lock device of the diaphragm closing device.

Other and further objects, features and advantages of the present invention will appear more fully from the following description.

BRIEF DESCRIPTION OF THE INVENTION

DESCRIPTION OF THE PREFERRED EMBODIMENT

Figure 1:
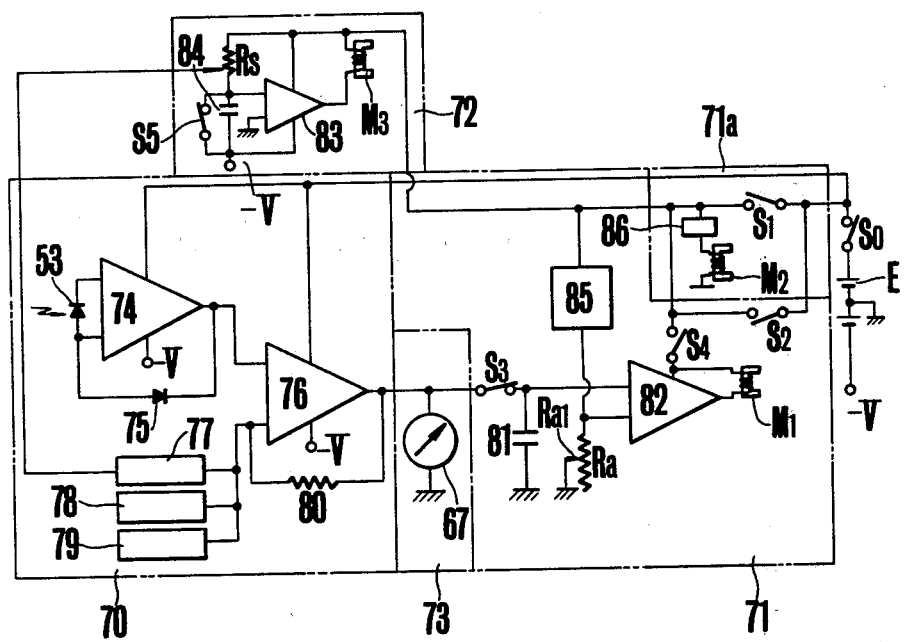
FIG. 1 shows the exposure control circuit of a camera.

FIG. 1 shows the exposure control circuit of the camera in accordance with the present invention. E is the power source, to which the light measuring circuit 70, the release circuit 71a, the aperture control circuit 71 and the electronic shutter control circuit 72 are connected through the power source switch $S_o$, whereby between the light measuring circuit 70 and the aperture control circuit 71 the aperture display circuit 73 is inserted. In this release circuit 71a, the delay circuit 86 is connected in series with the switch $S_1$ and the release magnet $M_2$. The delay circuit 86 serves to delay the exciting time of the release magnet $M_2$ so as to release the shutter after the magnet $M_2$ has been excited. Hereby this delay circuit is not necessary if this time delay is obtained mechanically. In the light measuring circuit 70, 74 is the amplifier connected to the power source $E_1$, whereby the light receiving or sensing element 53 is connected between the first input terminal and the second input terminal of the amplifier 74, while the compression log diode 75 is connected between the output terminal and the second input terminal of the amplifier 74. Further, the output signal of the amplifier 74 is delivered to the first input terminal of the operational amplifier 76 for carrying out the APEX operation. Further to the second input terminal of the operational amplifier 76, the shutter time setting signal from the shutter speed setting circuit 77, the film sensitivity setting signal from the film sensitivity setting circuit 78 and the exposure compensation information signal from the exposure correction information circuit 79. The automatic exposure control means includes elements 53, 74, 76, 77, 78 and 79. The automatic exposure control means receives object light by means of light receiving element 53 outputs it as object brightness information by means of amplifier 74, and inputs photography information from the film sensitivity setting circuit 78, the shutter speed setting circuit 77 and the exposure correction information circuit 79 to calculate the aperture value by means of the operational amplifier 76. Further between the second input terminal and the output terminal of the operational amplifier 76 the resistance 80. The output signal of this operational amplifier 76 is applied to the meter 67 as the aperture display circuit 73. Further the output signal of the operational amplifier 76 is delivered to the aperture control circuit 71 and then to the condenser 81 and the first input terminal of the comparator 82 through the switch $S_3$. This comparator 82 is connected to the power source E through the switch $S_1$ connected parallel to the manual switch $S_4$ and the hold switch $S_2$ and further through the afore mentioned power source switch $S_o$. The second input terminal of the comparator 82 is connected to the connecting point of the constant current circuit 85 with the variable resistance Ra. Further the output signal of the comparator 82 serves to control the excitation of the magnet $M_2$. In the electronic shutter control circuit 72, 83 is the Schmitt circuit connected to the power source E, while Rs is the variable resistance whose value varies in accordance with the shutter time setting signal of the shutter time setting circuit 77, whereby this variable resistance Rs constitutes a time constant circuit together with the condenser 84 connected parallel to the start switch $S_5$. The connecting point of this variable resistance Rs with the condenser 84 is connected to the first input terminal of the Schmitt circuit 83 whose second input terminal is earthed. By means of the output signal of this Schmitt circuit 83, the shutter control magnet $Mg_2$ is controlled.

Figure 2:
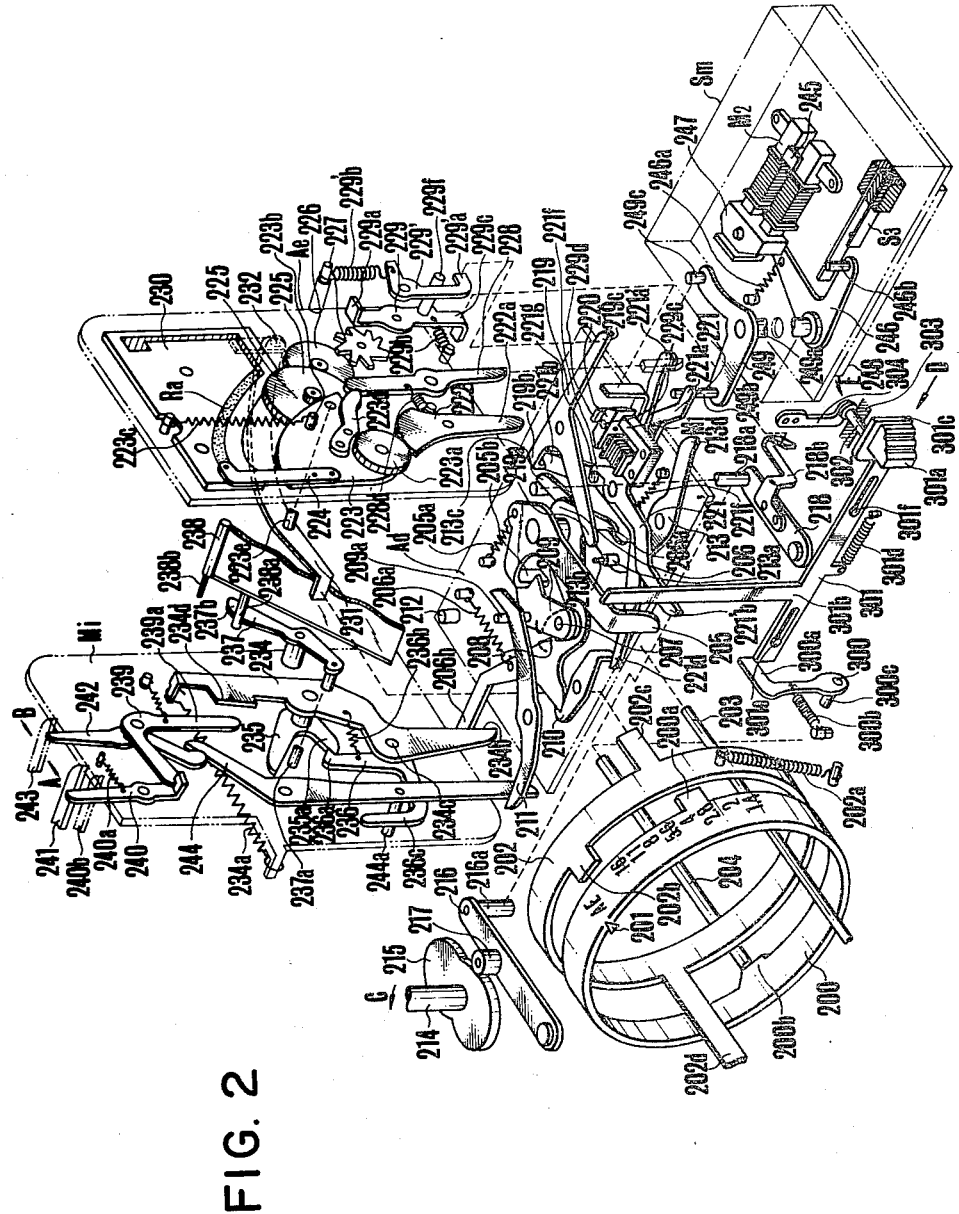
FIG. 2 shows the arrangement of the unit in the camera of FIG. 2 of the electromagnetic aperture control system, particularly in the neighborhood of the mirror box and the photographic lens in perspective view.

FIG. 2 shows the arrangement of the units in the camera, particularly in the neighborhood of the mirror box and the photographic lens, whereby the film has been wound up while the shutter has been charged. 200 is the aperture ring provided with the automatic aperture (AE) index and the manual aperture index together with the projection 200a and the cam part 200b. 201 is the index for making the automatic aperture (AE) index with the manual aperture index. 202 is the aperture preset means shown as an aperture preset ring being urged along the clockwise direction by means of the spring urging member or 202a and presenting a projection 202b engageable with the projection 200a of the aperture ring 200. Further, the aperture preset ring 202 is provided with the arm 202c and the lever 202d, which serves to determine the rotation of the bell crank by means of the aperture set cam ring not shown in the drawing, whereby the bell crank serves to control the rotation of the diaphragm driving ring not shown in the drawing so as to determine the opening degree of the aperture. 203 is the pin provided on the diaphragm driving ring, whereby the end of this pin 203 is engaged with the automatic aperture lever 205 urged along the counter-clockwise direction by means of the spring 205a of the automatic aperture unit (Ad). This automatic aperture lever 205 presents a falling down portion 205b. 204 is the auto-manual change over signal pin movable in functional engagement with the operation of the aperture ring 200 for making the AE index and the manual aperture index coincide with the index 201. On the above mentioned automatic aperture lever 205, the automatic aperture energy storage lever 206 is coaxially and rotatably mounted. This automatic aperture energy storage lever 206 is urged along the clockwise direction by means of the spring 206a, while at the middle of the one side of the lever 206 a shaft 207 is provided, whereby the shaft 207 is linked on the common lever 209 by means of the spring 208. The end of this common lever 209 is engaged with the falling down portion 205b of the aforementioned automatic aperture lever 205, being provided with the pin 209a. Further the automatic aperture energy storage lever 206 is provided a holding claw 210 for keeping the tension of the spring 206a. 211 is the automatic return signal lever, whose one end is provided at the position at which the end is engaged with the pin 209a of the above mentioned common lever 209. 212 is the stopper pin for controlling the rotation range of the automatic aperture energy storage lever. 213 is the charge lever for charging the spring 206a of the afore mentioned automatic aperture energy storage lever 206, whereby the stepped portion 213a of the pin provided at the middle of the change lever 213 is engaged with the spring 206a of the automatic aperture energy storage lever 206. The charge cam 215 is composed as one body with the shaft 214 functionally engaged with the winding up lever not shown in the drawing so as to charge the charge lever 213 in functional engagement with the winding up operation, whereby further there are provided the charge transmission intermediary lever 216, the roller 217 and the pin 216a provided on the intermediary lever 216. At the position diametrical to the charge transmission lever 216 there is an intermediary lever 218 connected by means of the connecting member not shown in the drawing, which is equipped with the pin 218a. At the middle of the intermediary lever 218 the magnet charge plate 218b consisting of an elastic material is fixed. 219 is the fork shaped operation lever, serving to attract the armature 220 by means of the yoke 220a of the aperture control magnet, whereby the one end 219a is engaged with the stepped portion 213b of the pin of the above mentioned charge lever 213 while the one 219b is held by means of the hook portion 221b of the release lever 221. Further another end 219c is engaged with the one end 229'a of the armature charge lever 229' to be explained later. The release lever 221 has the shape of a fork, being urged along the counter-clockwise direction by means of the spring 221f. The automatic exposure aperture control unit (Ae) presents a charge gear to be engaged with the end 213d of the afore mentioned charge lever 213, while on the sector gear 223 the gear 223a engaged with the charge gear 222, the slide member 224 for the resistance and the Ae holding plate 223d are fixed, whereby the sector gear 223 is engaged with the accelerating gears 225, 226 and the stop wheel 227. The pin 223b provided on the sector gear 223 presents a spring 223c, serving to urge the sector gear 223 along the clockwise direction. Further this spring 223c is designed weaker than the spring 202a at the side of the lens. 228 is the Ae holding lever whose one end is kept by means of the holding plate 223d of the sector gear 223 and whose other end is engaged with the end 221'a of the AE release lever 221'. The Ae release lever 221' is provided coaxially with the release lever 221, whereby the projection 221'c is engaged with the pin 221g provided on the release lever 221. 229 is the engagement lever presenting the stop wheel claw, being urged along the clockwise direction of the spring 229b and presenting the claw part 229a for stopping the rotation of the stop wheel 227 at the one end and the rising up portion 229d for preventing the swing motion of the armature 220, whereby the shaft 229c of the armature 220 is provided at the folded part 229e. Further the engagement lever 229 is provided with the positioning excentric pin 229f so as to adjust the motion transmission time of the armature charge lever 229'. The spring 229'b is provided at the one end of the lever 229' so as to urge the lever 229' along the counter-clockwise direction, whereby it is necessary to choose the urging power of the spring 229'b along the counter-clockwise direction much larger than the urging power of the spring 229b along the clockwise-direction. Hereby the reason why the strength of the spring 229b is sufficient if lever 229 can rotate against the weight proper to the lever is that it is sufficient that the armature 220 is in light contact with the yoke of $M_1$. The other end 229'a of the lever 229' is in engagement with the one end 219c of the operation lever 219. Hereby the above mentioned engagement lever 229 and the armature charge lever 229' are provided coaxially, but rotatable independently from each other. Ra is the automatic exposure control resistance. 231 is the signal lever whose one end is engaged with the arm 202c of the afore mentioned preset ring 202, at whose middle the pin 223e fixed on the sector gear 223 is linked and whose other end is pivoted on the support lever 232. The camera has automatic exposure aperture control means with engaging means including elements 231, 223, 202c, 202, converting means comprising resistance Ra and locking means including elements 223d, 228, 228d and stop means including elements 225, 226, 227 and 229. The mirror-up unit Mi presents a mirror driving lever 234 to be engaged with the end 206b of the afore mentioned automatic aperture energy storage lever 206, whereby the upper folded end of the lever 234 is urged along the counter-clockwise direction by means of the spring 234a. The mirror driving lever 234 and the mirror raising lever 235 are provided coaxially with each other, whereby the mirror raising lever 234 is engaged with the hook part 236a of the raising up holding claw 236 pivoted on the shaft 234c provided on the mirror driving lever 234. Further the raising up holding claw 236 is urged by means of the spring 236b along the clockwise direction. The mirror raising lever 235 is engaged with a pin 237a provided at the one end of the intermediary raising lever 237, while the other end 237b is engaged with the pin 238a provided on the mirror receiving plate 238. (238b is the rotary shaft of the mirror receiving plate 238.) Further the afore mentioned mirror driving lever 234 is provided with the convex portion 234d being engaged with the one end 239a of the front shutter plane holding lever 239 while the other end is engaged with the rising up portion of the front shutter plane release lever 240. The upper end of the front release lever 240 is engaged with the front shutter tensing lever 241 for starting the front shutter plane of the shutter mechanism not shown. 240b is the set lever for charging the spring 240a in functional engagement with the winding up mechanism not shown in the drawing. Further there is provided an independent rear shutter plane signal lever 242 coaxially with the front shutter plane holding lever 239, which lever 242 operates with the completion signal of the rear shutter plane of the shutter mechanism, being engaged with the signal lever 243. The other end of the lever 242 is engaged with the upper end of the mirror return signal lever 244, whereby the pin 244a provided at the middle of the mirror return signal lever 244 is engaged with 236c of the raising up holding claw 236. The lower end of the mirror return signal lever 244 is also engaged with the end of the automatic aperture return signal lever 211 of the afore mentioned Ad unit. In the camera release unit Sm, the magnet $M_2$ with the permanent magnet 245. The armature holding lever 246 is provided facing to the magnet $M_2$ with the permanent so as to hold the armature 247. The armature holding lever 246 is urged along the counter-clockwise direction by means of the spring 246a, whereby the spring 246a is designed stronger than the spring 221f of the afore mentioned release lever 221 but weaker than the attractive force of the permanent magnet 245. Further at the one end of the armature holding lever 246 a pin 246b is provided so as to be engaged with the memory switch $S_3$. The camera release unit Sm is a frame body consisting of non-magnetic material for casing such members as the magnet $M_2$, the armature holding lever 246, the memory switch $S_3$ and so on, being provided with the shield member 248 for shielding the magnetic influence on the lower side. Further the whole camera release unit Sm is provided in a casing so that it is connected with the shaft 249a of the start signal lever 249 for taking out the signal of the armature holding lever 246. The pin 249b provided on the start signal lever 249 is engaged with 221a of the afore mentioned release lever 221, while the pin 249c provided at the other end is designed so as to be engaged with the magnet charge plate 218b of the afore mentioned intermediary lever 218. Elements 221', 228 comprises release means.

The composition of the diaphragm closing operation member in accordance with the present invention will be explained below.

300 is the aperture holding lever being pivoted rotatably on the shaft provided on the base plate not shown, of the camera and urged along the counter-clockwise direction by means of the force of the spring 300b.

301 is the diaphragm closing slide plate presenting the diaphragm closing nob 301a and the rising up portion 301b and movable in the rotation range of the aperture holding lever 300 along the guide pins 301e and 301f by means of the force of the spring 301d. The rising up portion 301b of the diaphragm closing slide plate 301 is designed so as to be engaged with the automatic aperture lever 205 of the automatic aperture unit Ad and the end 221'b of the Ae release lever 221'.

303 is the wall of the camera body while 304 is the plate spring for pushing the pin 302 along the direction of the arrow E.

Below the exposure control operation will be explained, initially explaining the automatic exposure control will be explained.

The AE index of the aperture ring 200 is set at the index 201 and the switch $S_4$ is closed so as to actuate the automatic aperture control operation. Then the power source switch $S_0$ is closed, when the light measuring circuit 70 is ready for operation. Namely the light coming through the photographic lens reaches the light sensing element 53. In consequence the output of the light sensing element 53 in accordance with the brightness is delivered to the first input terminal of the operational amplifier 76 through the amplifier 74 and the log diode 75. Further to the second input terminal of the operational amplifier 76, the shutter time setting signal from the shutter time setting circuit 77, the film sensitivity setting signal from the film sensitivity setting circuit 78 and the exposure compensation information signal from the exposure compensation information setting circuit 79. In accordance with these signals, the operational amplifier 76 carries out the APEX operation. The output signal of the operational amplifier 76 is delivered to the meter 67 of the aperture value display circuit 73 so as to display the aperture value and to the first input terminal of the comparator, whereby the condenser 81 is charged. When then the shutter button 7 is pushed down, the switch $S_1$ is closed.

Thus, the output of the comparator 82 excites the magnet $M_1$, while the output of the Schmitt circuit 83 excites the magnet $Mg_2$ so as to lock the rear front gear 43. After the lapse of a certain determined time by means of the delay circuit 86 after the closure of the switch $S_1$, a current runs through the coil 220c of the release magnet $M_2$ so as to decrease the attractive force of the permanent magnet 245 in such a manner that the armature holding lever 246 is rotated along the counter-clockwise direction by means of the spring 246a so as to open the memory switch $S_3$ by means of the pin 246b. Thus the charge voltage of the condenser 81 is memorized. The signal start lever 249 which is provided outside of the casing as one body with the holding lever 249 is rotated along the counter-clockwise direction, which rotation amount is transmitted to the forked part 221a of the release lever 221 of the automatic aperture unit (Ad). The release lever 221 is rotated along the clockwise direction against the spring 221f, in accordance with which rotation amount the 221b of the hook part releases the holding of the falling down part 219b of the operation lever 219. At this time a current runs through the coil 220c of the automatic exposure aperture control magnet $M_1$ in functional engagement with the pushing down of the shutter button in such a manner that the operation lever 219 is attracted by the armature charge lever 229' by means of the engagement lever 229 of the automatic exposure control unit Ae against the spring 224'b so that even if the holding of the operation lever 219 is released the lever 219 does not operate until the current is interrupted. Further, along with the rotation of the release lever 221, the engaging means unlocking member, the Ae release lever 221' rotates along the same direction as that of the release lever 221 by means of the pin 221g and the projection 221'c in such a manner that the Ae holding lever 228 is rotated by means of the end 221'a. Hereby the holding of the sector gear 223 by means of the holding plate 223d in such a manner that the ring 202 starts to rotate along the clockwise direction against the force of the spring 223c through the signal lever 231 by means of the spring 202a of the aperture preset ring 202 at the side of the lens. The gears 225, 226 and stop wheel 227 in functional engagement of the sector gear 223 are rotated, being accelerated while the resistance slide member 224 of the sector gear 223 slides over the surface Ra of the resistance Ra. By means of releasing the above mentioned automatic exposure unit (Ae) the automatic exposure is decided by means of the signal of the photographic information in the afore mentioned FIG. 1 and the resistance value Ra, whereby the current running through the automatic exposure control magnet $M_1$ (electromagnetic means) is interrupted in such a manner that the engagement lever 229 is rotated along the counterclockwise direction by means of the spring 229'b of the afore mentioned armature charge lever 229' through the position adjusting excentric pin 229f so as to stop the rotation of the stop wheel 229. In accordance with the stop position, the rotation position of the arm 202c of the aperture preset ring 202 in engagement with the afore mentioned signal lever 231 is controlled in such a manner that the aperture value is determined with high precision. Nearly at the same time with the release of the Ae holding lever 228, the holding claw 210 is rotated along the counter-clockwise direction through the Ae release lever 221' by means of the end 221d of the afore mentioned release lever 221 so as to release the holding of the automatic aperture energy storage lever 206 and to rotate the lever 206 by means of the spring 206a. Along with the rotation of the automatic aperture energy storage lever 206, the automatic aperture lever 205 is rotated as one body along the clockwise direction through the common lever 209 so as to rotate the pin 203 of the diaphragm driving ring at the side of the lens and to close the diaphragm blade shown in the drawing. Elements 205, 202 and 203 comprise the actuating means of the automatic aperture means. Further the automatic aperture energy storage lever 206 is rotated along the direction along which the end 206b is more distant from the lower end 234b of the mirror driving lever 234 so that the mirror driving lever 234 is rotated along the counter-clockwise direction by means of the spring 234a. The end 235a of the mirror raising lever 235 coaxial to the mirror driving lever 234 is rotated, making one body of 236a of the raising up holding claw 236 along the same direction so as to rotate the pin 237a of the rising up intermediary lever 237 along the counter-clockwise direction while the mirror receiving plate 238 is raised upwards around the shaft 238b through the pin 238a of the mirror receiving plate 238 by means of 237b of the other end. Further along with the rotation of the mirror driving lever 234, the end 239a of the front shutter holding lever 239 is rotated along the clockwise direction by means of the convex portion 234d whereby the hook portion at the other end is departed from the rising up portion of the front shutter plane release lever 240, which rotate the front shutter plane tensing lever 241 along the direction of the arrow A by means of the spring 240a so as to allow the front shutter plane of the shutter mechanism unillustrated to start. Then the shutter mechanism operates with the set shutter time, whereby when the rear shutter plane has run, the signal lever 243 is rotated along the direction of the arrow B by means of the shutter closing signal. Thus, the rear shutter plane signal lever 242 is rotated along the counter-clockwise direction, the mirror return signal lever 244 is rotated along the clockwise direction, and the 236c of the mirror raising up holding claw 236 is rotated along the counter-clockwise direction by means of the pin 244a in such a manner that the engagement of the mirror raising up lever 235 with 235a is released so as to released the raised up state of the mirror receiving plate 238 whereby the mirror assumes the initial lower position by means of the spring not shown in the drawing.

The automatic aperture return signal lever 211 is rotated along the counter-clockwise direction by means of the lower end of the mirror return signal lever 244 so as to rotate the pin 209a of the common lever along the counter-clockwise direction and release the engagement with the falling down portion 205b of the automatic aperture lever 205. The automatic aperture lever 205 is rotated along the counter-clockwise direction by means of the returning spring 205a whereby the pin 203 of the aperture driving ring at the side of the lens follows the rotation of the automatic aperture lever 205 by means of a spring not shown in the drawing in such a manner that the diaphragm blade is totally opened so as to terminate the photography.

Below the winding up, charge operation after taking a photograph will be explained. The winding up shaft 214 and the charge cam 215 in functional engagement with the winding up lever not shown in the drawing is rotated along the direction of the arrow C so as to rotate the charge transmission lever 216 along the clockwise direction and the intermediary lever 218 connected to the lever 216 also along the clockwise direction. Along with the rotation of the intermediary lever 218, the charge lever 213 is rotated along the clockwise direction by means of the pin 218a, in such a manner that the automatic aperture energy storage lever 206 is charged along the counter-clockwise direction by means of the stepped portion 213a of the pin against the force of the spring 206a so as to be held by means of the holding claw. Further 219a of the operation lever 219 is rotated along the clockwise direction by means of the stepped portion 213b of the pin in such a manner that, the side surface of the lower end 229'a of the armature charge lever 229' being pushed, the armature charge lever 229' is charged against the spring 229'b, when the engagement lever 229 presenting the excentric pin 229f follows the armature charge lever 229' by means of the spring 229b so as to make the armature 220 be attracted by the yoke 220c of the magnet $M_1$. At this time the armature charge lever 229' is set so as to be rotated beyond the movable range of the engagement lever 229 by means of the operation lever 219 so that the irregularity due to the overcharge is not transmitted to the engagement lever 229, being absorbed by the rotation of the armature charge lever 229' and, in consequence, the armature 220 are brought in close contact with the yoke 220a of the magnet $M_1$ only by means of the force of the spring 229b, namely always under the same condition. At the time of the charge completion, the overcharge of the operation lever 219 is released in such a manner that the operation lever 219 is stopped, being held by means of the hook part 221b of the release lever 221. If at this time there is no adjusting member (the excentric pin 229f), depending upon the stop position of the end 219c the one end 229'a of the armature charge lever 229' is always in contact with the spring 229'b so that the irregularity in the stop position of the end 219c takes place also in case of the armature charge lever 229'. In order to absorb this irregularity by means of adjusting the excentric pin 229f of the engagement lever 229, the excentric pin 229f can be brought in contact with the armature charge lever 229' while the magnet $M_1$ is kept in contact with the armature 220 so that at the same time when the armature 220 is attracted by the yoke 220a of the magnet $M_1$ the falling down part 219b of the operation lever 219 is held by means of the hook part 221b of the release lever 221. Further the end 234b of the mirror driving lever 234 is rotated along the clockwise direction against the spring 234a by means of the end 206b of the automatic aperture energy storage lever 206. The mirror driving lever 234 is held by means of the holding claw 210 of the automatic aperture energy storage lever 206 so that the mirror driving lever 234 is held in the charged state. Along with the rotation of the mirror driving lever 234 the raising up holding claw 236 is rotated as one body along the same direction so as to be engaged with the mirror raising up lever 235. The front release lever 240 is rotated against the spring 240a by means of the set lever 240b in functional engagement with the winding up mechanism so as to be engaged with the front shutter plane holding lever 239. At the same time with the charge of the automatic aperture unit Ad and the mirror raising unit Mi, the lower end 222a of the charge gear 222 of the automatic exposure aperture control unit is rotated along the clockwise direction by means of the end 213d of the charge lever 213 so as to charge the sector gear 223 and to hold the holding plate 223d by means of the Ae holding lever 228. In functional engagement of the sector gear 223 the signal lever 231 is moved upwards (along the clockwise direction) so as to charge the arm 202c of the aperture preset ring 202 at the side of the lens against the spring 202a along the counter-clockwise direction at the preset start position (the position at which the diaphragm blade is totally opened) of the aperture preset ring 202.

By means of the afore mentioned intermediary lever 218, the charge for making the armature 247 of the permanent $M_2$ of the camera release unit Sm be attracted by $M_2$ is carried. The pin 249c of the start signal lever 249 is rotated along the clockwise direction by means of the magnet charge plate 218b of the intermediary lever 218 whereby the armature holding lever 246 composed as one body is charged against the spring 246a along the same direction so as to be attracted with the magnet $M_2$ with the permanent magnet. At this time the attraction of the armature 247 is charged by means of the rotation amount of the intermediary lever 218 so that in order to absorb the irregularity of the rotation amount the magnet charge plate 218b consists of an elastic body in such a manner that the irregularity can be absorbed with sufficient charge amount and the armature 247 is made to be attracted with the afore mentioned magnet $M_2$ with the permanent magnet.

Then, in order to take a photograph in the state in which the AE index of the photograph lens is changed over to the manual aperture index, namely in the manual mode, it is sufficient to design the automatic exposure control unit in such a manner that the rotation of the stop wheel 222 of the unit is not stopped by means of the switch not shown in the drawing or the mechanically engaged signal through the auto-manual change over signal pin 204 of the photographic lens, for example by keeping the current running through the automatic exposure control magnet $M_1$ until the start of the front shutter plane or by mechanically holding the stop wheel claw. Other operations are the same as previously described.

Below, the focus depth confirmation operation will be explained in accordance with FIG. 2. FIG. 2 shows the set state of the automatic exposure aperture control so that in order to confirm the depth the aperture ring 200 is set manually so as to set a certain determined aperture value at the index 201. At this time, the cam part 200b of the aperture ring is moved from the position of AE mark so that A-M change over pin 204 is at a position out of the cam part 200b the aperture holding lever 300 is moved along the counter-clockwise direction by means of the spring 300b of the aperture holding lever 300 at the side of the camera. In this state the end 300a of the aperture holding lever 300 is out of the movable range of the diaphragm closing slide plate 301. When the diaphragm nob 301a (making one body with 301) at the side of the camera is pushed down along the direction of the arrow D after the aperture value has been set as mentioned above, the diaphragm closing slide plate 301 is translated, whereby the side end of the automatic aperture lever 205 is pushed by means of the rising up part 301b in such a manner that the automatic aperture lever 205 is rotated along the clockwise direction against the force of the spring 205a so as to rotate the automatic aperture pin 203 at the side of the lens. At this time, the rising up part 301b of the diaphragm closing slide plate 301 is in contact with the end 221'b of the Ae release lever 221' pivotted coaxially with the release lever 221' so as to rotate the AE release lever 221'b, whereby the Ae holding lever 228 is rotated along the clockwise direction by means of the other end 221'a so as to release the holding of the sector gear with the holding plate 223d. Thus, the projection 202b of the preset ring 202 is brought in contact with the projection 200a at the position of the set aperture value by means of the spring 202a through the signal lever 231 so as to determine the preset value of the aperture preset ring 202 in such a manner that the depth at the actual opening degree of the diaphragm blade not shown in the drawing can be confirmed through the afore mentioned automatic aperture lever 205 and the automatic aperture pin 203.

At the time of confirming the depth, when the diaphragm closing nob 301a is pushed down along the direction of the arrow, the lock pin 302 projects out of the end surface 301c of the diaphragm closing slide plate 301, being guided along the wall 303 of the camera body, whereby the diaphragm slide plate 301 suppresses the returning strength of the spring 301d in such a manner that the depth confirming state is held, being locked. When the lock pin 302 is manually pushed against the plate spring 304, the pin 302 is departed from the end surface 301c so that the locking of the diaphragm closing is released by means of the springs 301d and 205a and the returning spring of the automatic aperture pin 203 so as to assume the initial state. Elements 301, 205 and 301b form the manual diaphragm closing means.

Below, the device for locking the diaphragm closing operation when the camera is set in the automatic exposure control (AE) mode will be explained. When the aperture ring 200 of the photographic lens is set at the AE mark as is shown in FIG. 2, the A-M change over signal pin 204 is pushed out by means of the cam part 200b, whereby the aperture holding lever 300 is rotated along the clockwise direction against the spring 300b. Thus the end 300a comes to be situated in the movable range of the diaphragm closing slide plate 301 in such a manner that the pushing down of the diaphragm closing nob 301a along the direction of the arrow D becomes impossible. Further, if the photographic lens is set at the AE mark while the diaphragm closing device of the camera body is locked at the diaphragm closing holding position when the photographic lens is to be mounted on the camera body, the lens mounting becomes impossible in such a manner that the misoperation due to the confusion of the automatic aperture lever 205 with the automatic aperture pin 203 is prevented.

As explained above, by means of applying the diaphragm closing device in accordance with the present invention to the camera of the electromagnetic aperture control system, the depth confirmation in advance of taking a picture can be carried out by putting the aperture ring out of the AE position so as to set the ring at a certain determined aperture value and pushing down the diaphragm closing button, whereby in the set state of the aperture ring at the AE position the diaphragm closing by means of the diaphragm closing button is impossible.

Figure 3:
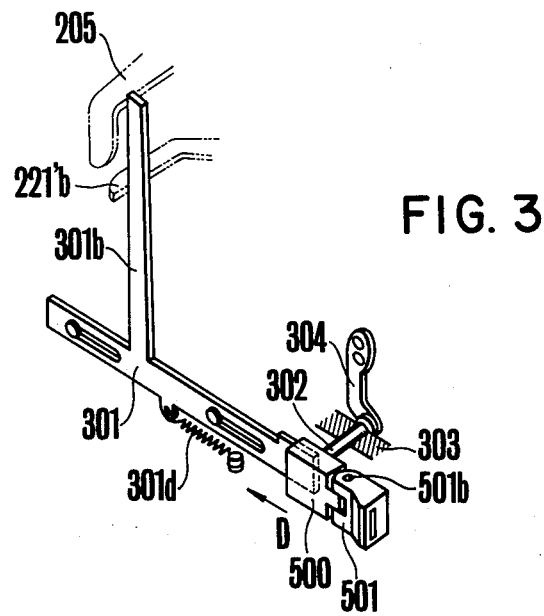
FIGS. 3, 4 and 5 show another embodiment of the lock part of the aperture mechanism in accordance with the present invention.
Figure 4:
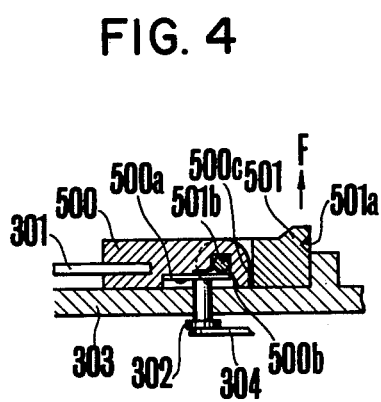

FIGS. 3 and 4 show another embodiment of the lock mechanism of the diaphragm part, whereby to members with the same figures as those shown in FIG. 2 are the same or the similar members.

500 is the diaphragm closing seat being fixed, making one body with the diaphragm closing slide plate 301, while the diaphragm closing nob 501 is rotatably pivoted on the diaphragm closing seat of 500 by means of the hinge 501b.

The hinge 501b is inserted in the diaphragm closing nob 501 so as to make one body with the nob 501, while the slip out prevention is constituted with the friction spring 500a fixed on 500. The friction spring 500a is provided so as to serve to absorb the shock not due to the adequate friction or at the time of the operation when the diaphragm closing nob 501 is pulled up along the direction of the arrow F. Further, when the diaphragm closing nob is pulled up by means of the hinge 501b and the friction spring 500a and further pushed down, a click feeding takes place so as to give the sureness at the time of the operation. 501a is the groove provided on the diaphragm closing nob, serving to help the nob be pulled up.

Figure 5:
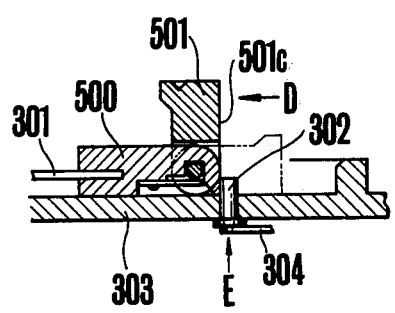

Below, the operation of the embodiment of the lock mechanism shown in FIGS. 3 to 5 will be explained. The aperture ring 200 is manually operated so as to set a certain determined aperture value at the index 201 in the same way as in case of the diaphragm closing operation shown in FIG. 2.

The diaphragm closing nob 501 is pulled up along the groove 501a against the force of the friction spring 500a along the direction of the arrow F and pushed along the direction of the allow D, when the diaphragm closing slide plate 301 plays the role as explained in accordance with FIG. 2 so as to confirm the desired focus depth.

During the pressing of the diaphragm closing nob 501, the lock pin 302 provided on the wall of the camera body is pushed out against the force of the plate spring 304 by means of the inclined part of the diaphragm seat 500, whereby by means of a certain pressing amount of the diaphragm nob 501 the lock pin 302 project again along the direction of the arrow E by means of the plate spring 304 so as to be brought in contact with the shoulder 500c of the diaphragm closing seat 500 and suppress the returning force of the diaphragm closing nob 501.

The diaphragm closing lock is released by laying down the above mentioned the diaphragm closing nob 501 along the inversed direction to the arrow F in such a manner that the lock pin 302 is pushed by means of the end 501c against the plate spring 304 so as to be departed from shoulder 500c.

Further in order to carry out only the focus depth confirmation without locking the diaphragm closing, the diaphragm closing nob 501 is brought in the state shown in FIG. 6 in a dotted line, namely not pulled up along the direction of the arrow F but pushed along the direction of the arrow D in such a manner that the lock pin 302 is kept in the pushed down state, being out of the contact with the shoulder 500c, whereby the locked state can not be kept and when the diaphragm closing nob 501 is no more pushed along the direction of the arrow D, the nob 500 returns by means of the spring 301d so as to resume the initial state.

The diaphragm closing lock mechanism in accordance with the present invention contribute much to the improvement of the operability at the time of the focus depth confirmation and at the time of the diaphragm lock release with and without the diaphragm closing lock.

It is possible to constitute the lock pin 302 and the plate spring 304, while the plate spring can be substituted with a coil spring and so on.

As explained above, by applying the diaphragm closing device in accordance with the present invention to the camera with the electromagnetic aperture control system, it is possible to carry out the depth confirmation by bringing the aperture ring out of the AE ring, setting the ring at a certain determined aperture value and pushing down the diaphragm button, and in the set state of the diaphragm ring at the above mentioned AE position the diaphragm closing by means of the diaphragm closing button becomes impossible so that the depth confirmation can be carried out with sureness so as to be able to avoid the misoperation, which is quite profitable.

What is claimed is:

1. A diaphragm closing arrangement for a camera having electrical exposure control means and an interchangeable lens, said arrangement comprising:
    (1) an interchangeable lens including:
        (a) a diaphragm device;
        (b) an aperture ring which is rotatably mounted at an outer ring portion of the interchangeable lens and is provided with aperture value graduations for manual adjustment and an automatic exposure position mark; and
        (c) aperture preset means which engages with the diaphragm device and the aperture ring and presetting the diaphragm device by the aid of an urging member at a value corresponding to an aperture value graduation at which the aperture ring is set;
    (2) a camera body which permits mounting the interchangeable lens thereon including:
        (a) automatic exposure control means provided with computing means for computing an aperture value by receiving information on the brightness of an object to be photographed and information on setting made for photographing;
        (b) automatic exposure aperture control means provided with engaging means which engages with said aperture preset means to be moved by the urging force of said urging member, converting means for producing an electrical signal corresponding to the degree to which said engaging means is moved, locking means for locking said engaging means in a predetermined position, and stopping means which stops the movement of the engaging means, the automatic exposure aperture control means thus being arranged to move said aperture preset means to a position corresponding to the moving degree of the engaging means;
        (c) release means for releasing said locking means in response to a release action of the camera;
        (d) electrical control means for producing a control signal on the basis of the signal produced by said computing means and the signal produced by the converting means;
        (e) electromagnetic means which is electrically connected to said electrical control means and engages with said stop means for actuating the stop means in response to said control signal in such a manner as to stop the engaging means at a position corresponding to a computation output produced by said computing means; and
        (f) automatic aperture means provided with actuating means which stops down the diaphragm device into a position where the aperture preset means which is interlocked with said engaging means is movable; and
    (3) diaphragm closing means suitable for combination with said camera and interchangeable lens, the diaphragm closing means including:
        (a) an engaging means unlocking member arranged to permit operation thereof from the outside of the camera to release said engaging means from the locking action of said locking means; and
        (b) manual diaphragm closing means for permitting manual operation of said actuating means and said unlocking member from the outside of the camera to cause said aperture preset means to rotate to an aperture value to be set on the aperture ring and at the same time to cause said actuating means to close the diaphragm device down to the set aperture value.

2. The diaphragm closing arrangement according to claim 1, including prohibiting means which prohibits a diaphragm closing operation of said manual diaphragm closing means when said aperture ring is set at the automatic exposure position mark.

3. The diaphragm closing arrangement according to claim 1, further including second locking means for locking the engaging means unlocking member in response to a predetermined stroke of the manual diaphragm closing means so that the engaging means unlocking member is held in a predetermined position.

4. The diaphragm closing arrangement according to claim 3, further including a release member for releasing the second locking means, the release member rotatably connected to the unlocking member.

5. The diaphragm closing arrangement camera according to claim 4, wherein the stationary part of the diaphragm closing knob and said rotatable knob part thereof are connected to each other by a hinge with an urging member provided at the hinge for imparting friction during a rotating operation of the rotatable knob part.

6. A diaphragm closing arrangement for a camera having an electromagnet diaphragm control means and being arranged to permit mounting of an interchangeable lens having a diaphragm device and an interlocking member which controls the diaphragm device in accordance with a signal received from the camera side, the arrangement comprising:
    (1) a camera portion having:
        (a) light measuring circuit means including a computing means which computes an aperture value by receiving information on the brightness of an object to be photographed and information on setting made for photographing;
        (b) automatic exposure aperture control means provided with engaging means which engages with said interlocking member of the interchangeable lens, locking means which locks said engaging means in a predetermined position, and converting means which produces an electrical signal corresponding to a degree to which the engaging means is moved;
(c) release means including a release member which moves said engaging means from said predetermined position in response to a release operation of the camera;
(d) electrical control means which receives the output of said computing means and that of said converting means and produces a control signal;
(e) electromagnetic means including a magnet member which is connected to said electrical control means for operating in response to the control signal and a stop means which stops the movement of said engaging means in response to the operation of said magnet member; and
(f) automatic aperture means including actuating means which engages with the interlocking member of the interchangeable lens and stops down the aperture of the diaphragm device through the interlocking member to adjust it to an aperture value corresponding to the moving degree of said engaging means; and (2) a diaphragm closing device having:
(a) manual stop-down means operable from the outside of the camera and engageable with said actuating means and said release member, the manual stop-down means being arranged to operate to release said engaging means from the locking action of said locking means and which concurrently causes said actuating means to stop down the diaphragm device.

7. The diaphragm closing arrangement according to claim 6, including stop-down prohibiting means having a moving member which moves in accordance with a signal from an interchangeable lens mountable and dismountable on and from the camera, the stop-down prohibiting means being arranged to prohibit the stop-down operation of said stop-down means according to the moving position of said moving member.

8. The diaphragm closing arrangement according to claim 6, including stop-down locking means provided with a locking member which, in response to a stop-down operation, moves to a position to which said stop-down means is moved and locks the stop-down means there to prevent a returning action thereof.

9. The diaphragm closing arrangement according to claim 8, further including an urging member which urges said locking member to retain it in a position at which said stop-down means is locked.

10. The diaphragm closing arrangement according to claim 9, wherein there is provided a stop-down knob which rotatably engages with one end of said stop-down means; said stop-down means being caused to make a stop-down operation and is locked by rotating and depressing said stop-down knob; and the stop-down means being unlocked by the end face of the stop-down knob when it is rotated back into its original position.

11. The diaphragm closing arrangement according to claim 10, wherein said stop-down means and a rotatable part of said stop-down knob is connected to each other by a hinge, urging means also being included which pushes the hinge portion to bring about a frictional effect between the stop-down means and the stop-down knob.

* * * * *